United States Patent [19]

Otfinoski et al.

[11] Patent Number: 4,664,973

[45] Date of Patent: May 12, 1987

[54] POROUS METAL ABRADABLE SEAL MATERIAL

[75] Inventors: William F. Otfinoski, Meriden; Harry E. Eaton, Woodstock; Richard C. Novak, Glastonbury, all of Conn.

[73] Assignee: United Technologies Corporation, Hartford, Conn.

[21] Appl. No.: 772,200

[22] Filed: Sep. 5, 1985

Related U.S. Application Data

[63] Continuation of Ser. No. 565,542, Dec. 27, 1983, abandoned.

[51] Int. Cl.$^4$ .............................................. B05D 1/08
[52] U.S. Cl. ................................... 428/307.3; 423/592; 501/132
[58] Field of Search .................... 423/592; 427/34; 501/132; 428/698, 307.3

[56] References Cited

U.S. PATENT DOCUMENTS

| 2,989,373 | 6/1961 | Llewelyn et al. | 423/592 |
| 3,092,306 | 6/1963 | Eder | 230/133 |
| 3,147,087 | 9/1964 | Eisenlohr | 29/191.2 |
| 3,342,547 | 9/1967 | Illis et al. | 423/592 X |
| 3,350,178 | 10/1967 | Miller | 75/222 |
| 3,540,884 | 11/1970 | Horbury | 75/211 |
| 3,723,165 | 3/1973 | Longo et al. | 117/93.1 PF |
| 3,964,877 | 6/1976 | Bessen et al. | 29/182 |
| 4,053,578 | 10/1975 | Hill et al. | 423/592 |
| 4,336,276 | 6/1982 | Bill et al. | 427/34 |

Primary Examiner—Nancy A. Swisher
Attorney, Agent, or Firm—C. G. Nessler

[57] ABSTRACT

Porous metal structures are especially useful as abradable seals in axial flow compressors. Carefully defined oxide content and density provide a superior combination of abradability and particulate erosion resistance. The seals are comprised of 1-30 weight percent oxide and have 27-38 percent of the solid metal density. A preferred seal is made by plasma arc spraying a mixture of 80Ni-20Cr and polymethylmethacrylate powders and then heating the resultant deposit in air to about 315° C. to cause the polymer to flee. The nichrome seal will have less than 15 percent oxide and a density of about 2.7 g/cm$^3$, about 32 percent of the solid metal density.

23 Claims, 2 Drawing Figures

POROUS METAL ABRADABLE SEAL MATERIAL

This application is a continuation of application Ser. No. 565,542, filed Dec. 27, 1983 and now abandoned.

TECHNICAL FIELD

The present invention relates to the field of porous metal structures, particularly those useful as abradable seals in turbomachinery.

BACKGROUND

Abradable seals are used in turbomachinery to maintain the closest clearances between spinning blades and the surrounding case structure. They are comprised of materials which are particularly adapted to fragment and disappear when contacted by the blade tips which are spinning at high speeds. As generally mentioned in U.S. Pat. Nos. 3,879,831 to Rigney et al and 3,084,064 to Couden et al, abradable seals must have a peculiar combination of properties. On the one hand they must be resistant to erosion from the high velocity gas streams which at times carry fine particulate matter with them. On the other hand, they must be capable of disintegrating when contacted by the tip of a high speed blade, so that the tip of the blade is not substantially degraded. This mode of behavior is highly desirable because if the rotating parts and surrounding casing come together too closely at one point around the circumference, it is in the casing that the wear should take place. When this is not so and when the blade tips wear, then the clearance between the blades and case will be increased all around the circumference, with the result that the leakage is greatly increased beyond that which would occur with a properly functioning abradable seal.

The foregoing is only a simplified description of the properties which abradable seal must have. It must also of course be structurally sound to resist failure at points other than where the blade is contacting it, it must resist the thermal and vibratory strains imposed on it by its use, it must be readily fabricated in a reproducible and cost effective manner, and so forth. Considerable effort has gone into the development of abradable seals which have the desired combination of properties and the present invention is reflective of that continuing effort.

In the past, abradable materials have been comprised of heterogeneous combinations of non-metals and metals, as described in the patents mentioned above; or, as porous structures, obtained by use of a fugitive material in the precursor article. See U.S. Pat. No. 4,269,903 to Clingman et al and U.S. Pat. No. 3,540,884 to Horbury.

The present invention is concerned with the last mentioned process, and particularly with seals which are used in the compressor part of a gas turbine engine. Typically, compressor blades are made out of titanium, nickel or iron base alloys. Operating temperatures range from a few hundred degrees up to 540° C. The abradable seal material is generally applied to a substrate structure, most commonly a circumferential ring attached to the casing. In the prior art, pressing and sintering and other powder metallurgical techniques have been used together with thermal spraying to make porous structures. Metals can be sprayed with densities as low as 75–80% by plasma arc spraying them alone, with the correct set of parameters. However, to obtain densities less than this, which are found to be desirable for abradable seals, it is necessary to incorporate a non-metallic material. Most preferably a fugitive material such as a water soluble salt or a volatilizable polymer is sprayed with the metal and removed in a second operation. For instance, an abradable seal structure can be made by spraying a polyester resin and a nichrome metal, generally along the lines taught by Longo et al in U.S. Pat. No. 3,723,165, and then removing the polyester by heating the resultant structure to a temperature of about 540° C. in air.

However, the metal abradable seals made previously have not exhibited a fully satisfactory set of properties. In some instances, the abradability will be good but the mechanical strength, and in particular the erosion resistance, will be inadequate. When parametric and material changes are made to increase the latter property, then the abradability is insufficient and excessive blade wear takes place. Because of the complex dynamics of engine operations and the high cost of testing materials by running them in an actual engine, the simplified specimen testing which has been employed has not lead to the easy identification of materials which are good and materials which are inferior.

DISCLOSURE OF INVENTION

An object of the invention is to provide as the abradable portion of a seal component for a turbomachine a material which has a superior combination of abradability and erosion resistance. Another object of the invention is to delineate the configurations of nichrome seal materials which are most advantageous for durability.

The present invention results in an improved abradable seal through control of the key variables of oxide content and density. Seals in accord with the invention are comprised of high temperature alloys having a relatively low density (high apparent porosity) and a specific maximum oxide content. The oxide content should be maintained below about 30 weight percent, preferably 1–15 percent. Normally oxidation is a contributor to embrittlement of metals and this would be thought to be good in increasing abradability (which is the ability of a material to easily disintegrate when contacted by another, e.g. a blade tip). While the contrary is found to be true, higher oxygen contents are permissible with lower densities of materials. However, the density must be maintained above at least about 27% because particulate erosion drastically increases when lower densities are used.

Thus, seals in accord with the invention will have apparent densities in the range of 27–38% of the metal which is sprayed and will have an oxide content of less than about 30%, preferably 1–15%. The apparent density is found by measuring the seal material density compared to the theoretical density of the solid metal and it is influenced by the oxide content. Preferably the seal is 29–32% dense and more preferably it is 30–32%. Another measure of a good seal is the superficial hardness. Nichrome seals will have a Rockwell$_{10}$Z hardness of 45–85, typically 60–75.

The seals are preferably made of thermal sprayed coarser powder, with −250 mesh powder preferred over −325 mesh powder because of lower oxide content tendencies. Also, the preferred seals have pores with spherical section shapes since these are associated with seals having lower oxide contents.

Seals of the invention perform substantially better than prior art seals which were not controlled so closely with respect to the combination of density and oxide content. Not only are the new seals durable under erosion but they have very favorable high wear rate characteristics when contacted with a relatively rotating turbomachinery part.

The foregoing and other objects, features and advantages of the present invention will become more apparent from the following description of preferred embodiments and accompanying drawings.

BEST MODE FOR CARRYING OUT THE INVENTION

The best mode of the invention is described in terms of the alloy comprised by weight percent of 80 Ni and 20 Cr. This alloy, called nichrome herein, is one composition of a general series of known nichrome alloys. These alloys are dominantly nickel and have contained within them chromium and other elements. Traditionally, they have been preferred alloys for electric resistance heating elements because of cost, high temperature strength and oxidation resistance and formability. The invention will be generally applicable to other wrought non-hardenable nickel base alloys, including well-known Hastelloy alloys (Cabot Corporation) and Inconel alloys (Inco Ltd). As indicated below, the invention is also applicable to hardenable nickel alloys, particularly those strengthened by a gamma prime phase. Based on related experience the invention will be pertinent to other high temperature and heat resisting alloys based on nickel, iron, cobalt and mixtures thereof.

In use, an abradable seal for an engine is generally comprised of the porous metal structure with which the invention is concerned and an attached support piece, usually made of a superalloy. These are referred to in the references mentioned in the Background and the disclosures thereof are hereby incorporated by reference. When we refer to an abradable seal herein, we refer to the porous metal part thereof.

Figure 1:
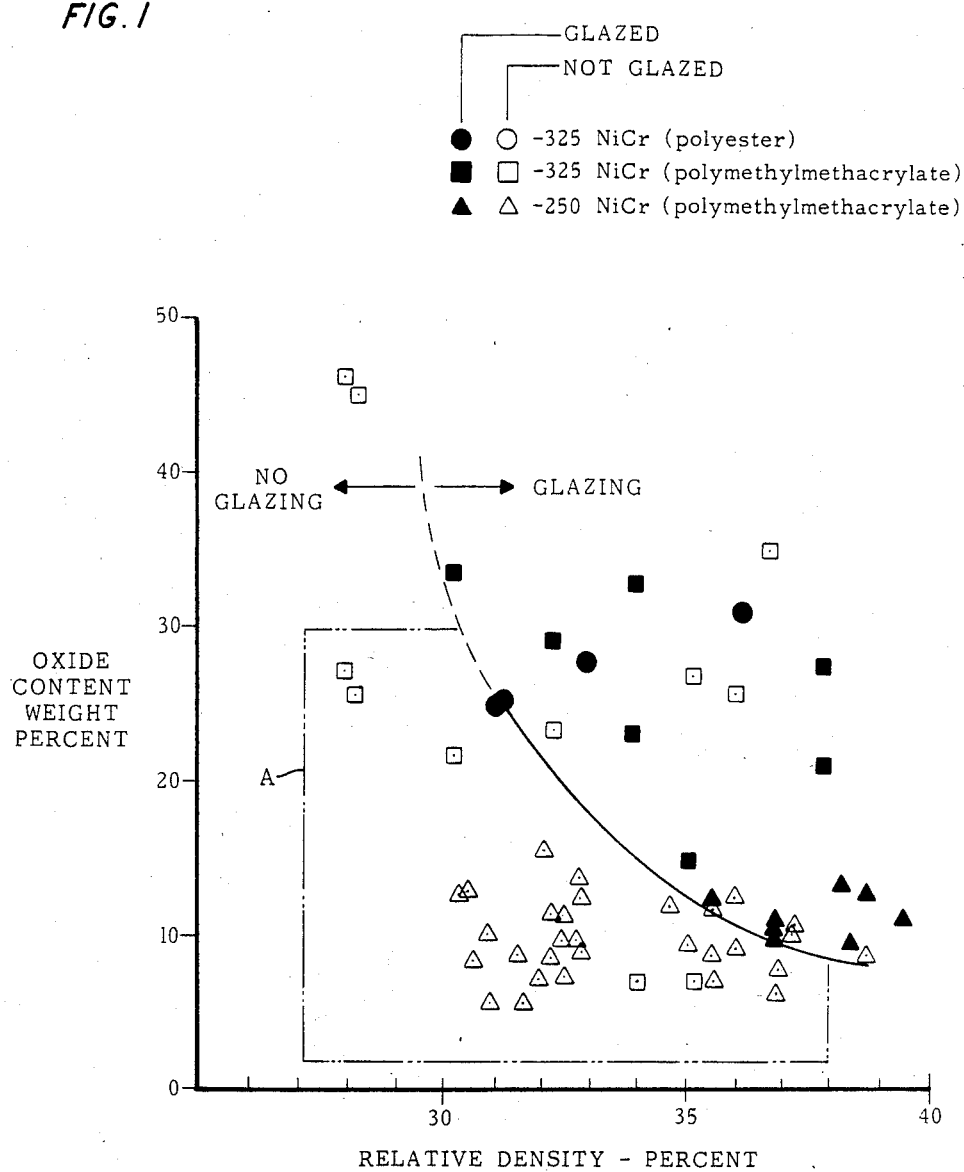
FIG. 1 is a graph showing the influence of oxide content and density on abradability, as measured by the tendency of a rubbed seal to glaze.

As indicated above, the invention involves control of the structure and chemical composition of porous metals. FIG. 1 shows seal abrading test data which was accumulated for various porous metal seals in the making of the invention, as measured by the presence or absence of glazing. The glazing test is a modeling of the conditions to which an abradable seal is subjected when it is used in the compressor section of a gas turbine engine. In the test several titanium blade shapes, usually six, are mounted radially around the periphery of a disc and rotated at high speeds so that their tip velocity is about 290 m/s. The six blade test is contrasted with a single blade test which does not produce identical results insofar as glazing is concerned. Abradable material, generally in a 60° arc shape having about 0.1 m radius is positioned proximite to the rotating tips of blade models and is moved relatively toward the center of blade rotation. The blade models are 1.5 mm thick paddles made of Ti-6Al-4V. The rate and depth of engagement are controlled, with typical parameters being an engagement rate of about 0.05 mm/s and a depth of engagement of about 1 mm, in a room temperature test. The loss of abradable seal material and that from the blade is measured. Of course, the preferred result is that hardly any material is removed from the blade tip and good seals are deemed to be present when the wear of the tip is relatively low, of the order of 0.05 mm or less. Such seals are deemed to have good abradability. This means that the seal is characterized by tending to easily disintegrate in a friable mode when it is contacted by a high speed moving part, such as a blade tip. In the absence of such easy disintegration behavior, the tip of the blade will be excessively heated and degraded itself.

A correlation has been made over the course of extensive testing experience in that when there is excessive removal of material from blades there is also associated therewith a characteristic appearance in the seal where it has been rubbed by the blade. When the abradability of the seal material is poor, it is found that the surface of the seal is left with a relatively shiny metallic appearance. In contrast, for abradable materials which are good in being sacrificial, the rubbed surface has a dull grayish appearance, more or less similar to the appearance it had prior to the test. (When glazing results it evidently is a manifestation of a substantial change in mode of interaction as there tends to be a substantial increase in relative wear. Blade wear up to 0.5 mm might be encountered. Volume Wear Ratio (VWR) is a parameter used by some to measure abradability, being the ratio of seal volume removal compared to the volume of blade removal. Here again, only substantial changes are meaningful in significantly distinguishing seals. By example, the 0.05 mm blade wear in our six blade test is about equal to a VWR of 250; ratios more than that are good; those less than that, e.g., around 100 are poor. For less meaningful single blade rub tests a good VWR is greater than 10 while a poor VWR is less than 10.)

The basic purpose of the seal is to circumscribe a rotor of many blades and to prevent the passage of gases around the tip ends. Only under transients and atypical operation do the blade tips contact the seal. Thus, a prime requisite of seals is that they have adequate mechanical strength and resistance to particulate erosion, e.g., sand particles carried in the air. Thus, there is a second test which is utilized to evaluate the performance of abradable seal materials. This is comprised of an erosion test in which the abradable seal material is impacted by a sandblast, or air stream carrying abrasive particulates. The relative performance of materials is ranked in this test, based on the amount of material which is removed from the surface of an abradable material per unit volume of abrasive material impacted on the surface. Typical standard conditions comprise impacting the seal at a 15°-20° angle with −250 Tyler Sieve Series mesh alumina grit carried in a 240 m/s velocity stream of 650° C. air.

Figure 2:
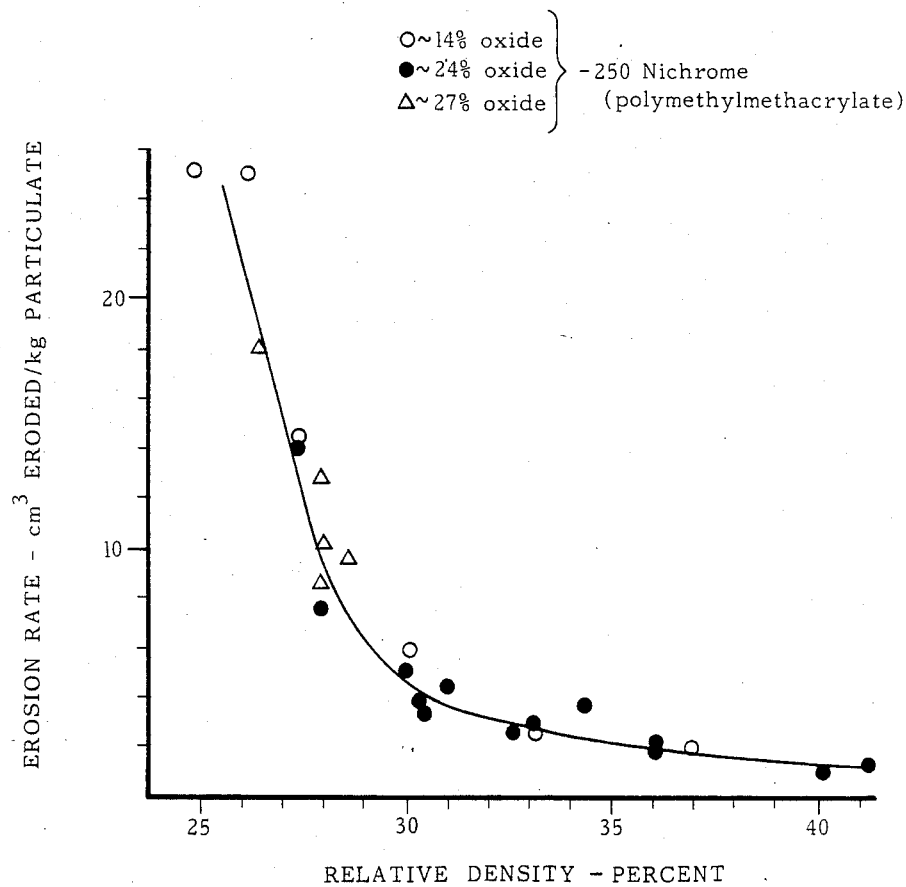
FIG. 2 is a graph showing how the erosion of a seal subjected to a particulate stream is dependent on density.

FIGS. 1 and 2 respectively show representative data from the abradability test and the erosion test. In FIG. 1, data from tests conducted as described above show that the combinations of density and oxide content to the left of the solid curved line are representative of good abradable materials while those to the right, at higher density and higher oxide content, are less good in that they have glazed. Referring to FIG. 2, it is seen that there is a tendency towards greatly increased erosion as the density is decreased. Thus there are conflicting tendencies insofar as density is concerned. Low density permits more latitude in oxide content but produces less erosion resistance. As a corollary, it is necessary to hold oxide contents beneath certain maximum levels if good abradability is to be obtained. (There has been no significant effect observed for oxide content on erosion resistance.)

From the data in the Figures it is seen that the density is preferably less than about 38% and more than about 27% and the preferred density is in the range of 29–34%. In practice we most prefer 30–32%. Densities greater than 38% will give good erosion resistance, they also mean that the oxide content must be maintained at a very low level, at less than 10%. While this is feasible and can be done as evidenced by the data, for fine NiCr powder an undesired inert atmosphere processing would be needed to assure it. The oxidation which occurs is a function of the oxide content of the powder, the process of spraying, and the process of removal. The minimum oxide content of 0.5–1.5 weight percent is a characteristic of commercial powder. There is inevitably a strong preference for densities less than 38%.

Also, at very high densities of 60–70% or more, the material tends to assume the properties of solid metal and does not abrade properly. The lowest density in the invention is controlled by practical considerations and what is deemed to be the maximum acceptable erosion rate which is a function of the environment anticipated. An erosion rate of about 15 $cm^3/kg$ has been deemed to be the maximum acceptable for long life commercial engines based on test experience. Thus the density ought to be greater than about 26–27% based on FIG. 2. Also, as a practical matter, more consistent and reproducible seals are made when densities are in the higher ranges. Because of the break in the curve around 29–30%, values above this level are preferred.

The oxide content is desirably in the 1–15% range but it may be in the 1–30% range, because of its interrelation with the density, according to the area A in FIG. 1. Even higher oxide contents are usable but the resultant close control of density necessitated at the lower end of the useful density range makes this very undesired. The nature of industrial processes, even those closely controlled as are characteristic of the aerospace industry, mean there will be variations from part to part. It also should be understood that there will be the usual variation of plus or minus of a percent or two applied to the limits herein because of variations from specimen to specimen and in analytical measurements.) The oxide content for −250 Tyler Sieve Series mesh NiCr powder is lower on average than −325 mesh powder, when the preferred polymethylmethacrylate is used, as evident from FIG. 1. Thus, the coarser powders are preferred in making our invention.

It is surprising that lowering oxygen content improves abradability inasmuch as it generally is thought that oxygen embrittles materials. Our investigation thus far is insufficient to illuminate all the underlying phenomena of the invention. Certainly, the erosion rate data are understandable insofar as they represent a general trend of increasing erosion rate with decreasing density.

We have discovered that there is another parameter by which we can characterize the density of those materials which are good for abradable seal use from those which are not good. The superficial hardness of a smooth and cleanly machined seal is measured in a Rockwell machine, on the Rockwell$_{10}$Z scale (i.e., using a 19 mm dia ball and a 10 kg load). The degree of indentation is measured in the normal mode of Rockwell testing and correlated on an arbitrary relative scale. For nichrome, the hardness of useable gas turbine seals will fall in the range 45–85 and will most preferably be 50–75. Seals made with polymethylmethacrylate work best at 60–75 while polyester made seals work best at 50–65. Measuring the hardness is a convenient way of characterizing the material without the tediousness of measuring its density. Of course the hardness is not only a measure of density or porosity but of the intrinsic material strength. The nichrome particles of our plasma sprayed seals have about 240 VHN microhardness. Other materials we have sprayed and their hardnesses are NiCrAl-250; NiCrAlY-300; FeCrAlY-320; CoCrAlY-630. Thus the general principles of our invention as they are elucidated for the superficial hardness of nichrome will be applied to other materials in accord with general principles of materials behavior.

The oxide content which is referred to herein is that which is measured chemically by a digestion technique familiar in conventional chemical analysis. For 80Ni-20Cr nichrome the article being tested is immersed in a solution of methanol and 5 volume percent bromine at a temperature of about 75° C. to dissolve all the metallic content. The insoluble residue is weighed and is characterized as oxide, there being no insignificant other insolubles believed present in sprayed nichrome deposits. The density which is referred to herein is an apparent density. By this is meant that the following procedure is used: An abradable specimen is weighed and its volume is determined to produce the specific gravity of the specimen. This is divided by the specific gravity of the solid metal alloy, e.g., 80Ni-20Cr, to produce the density number which is used herein. However, it is recognized that to the extent the specimen contains oxide, and to the extent the oxide has a different density from the metal alloy, the density percent is not a true number. In fact, although the nichrome oxides have not been fully characterized by us and although the oxides are intimately mixed with the metallic content of an abradable structure, the oxides are not believed to have a density which is substantially different from the metal. (For example, the specific gravity of NiO is 7.45; Ni is 8.9; $Cr_2O_3$ is 5.2; Cr is 7.2; and 80Ni-20Cr is 8.4. Simple calculation will show that oxidized nichrome has a density which is about 90% of the metal. Thus, even though our density numbers are not true numbers, the errors are relatively small and will not make significantly in error the density limits by which we define our invention, it being evident from the presentation and scatter of the supporting data that those limits are nominal.)

The manner of making our abradable seals is described in detail in the related application Ser. No. 565,541filed on even date herewith by Eaton and Novak, two of the inventors herein, the disclosure of which is hereby incorporated by reference. To summarize, in the preferred practice of making our seals, plasma arc spraying or other thermal spraying process is used to deposit a mixture of metal and polymer powders. The polymer is then caused to flee from the deposit, leaving behind a porous metal structure. Any polymer or other fugitive which achieves the objects of the invention, namely the desired density and oxide content, may be used. However, we have found that a polymer which depolymerizes is preferred. This is contrasted with the older techniques where a higher temperature polymer is used and where it must be removed by oxidation. When the polymer is of a type necessitating heating to a high temperature, the deposit can oxidize unduly. Furthermore, when the polymer is removed by oxidation, we have found that temperatures can exceed those of the nominal furnace temperature to which the specimen is subjected. For instance, if a polyester resin such as polyparaoxybenzoyl (Ekonol of the Carborundum Company) is used, the metal seal temperature will rise to the range of 625° C. when the furnace temperature is nominally 540° C. Thus, polyester produces high oxide content in general and seals falling to the right of the line in FIG. 1 will be erratic insofar as glazing or not glazing. Preferably, we use polymethylmethacrylate, such as Lucite grade 4FNC-99 powder (DuPont Company). This material is easily removed by heating the metal and polymer deposit to a temperature of about 315° C. for about 2 hr, causing the polymer to convert to the volatile monomer.

In the preferred practice of making nichrome abradable materials, we spray 80–90 weight percent nichrome with 20–10 polymethylmethacrylate. These mixtures, sprayed by plasma arc torch, produce deposits of 35–45 volume percent polymer, preferably 37–43 percent. The resultant metal deposits, after the polymer is caused to flee, have densities in the range of 30–50% of the base metal. As a specific example, 86 nichrome and 14 Lucite polymer are sprayed; (47:53 volume ratio). They do not necessarily deposit with the same efficiency. Weight loss measurement during removal of the fugitive polymer shows the deposit was 43 volume percent polymer. Thus, the resultant structure is at least 32% void. Density measurement shows a value of 2.7 g/cm$^3$, about 32% of the solid metal (8.4 g/cm$^3$), meaning the apparent porosity is 68%. This is greater than that provided by the polymer, and the variance is evidently due to the porosity of the metal-polymer deposit which is made by plasma spraying and the presence of oxide. We use plasma arc spraying with a Metco Model 7B gun in air with a 50—50 volume of argon-helium mixture at an enthalpy of about 7 kwhr/m$^3$; the powder being injected just downstream of the gun nozzle opening. Other aspects of application are within the known conventional practice.

Other thermal spraying techniques may be utilized to obtain the initial deposit. Naturally, the process should not produce excess oxidation of the deposit. But when we use the low temperature polymer, there is insignificant additional oxidation during the polymer removal process and substantial oxidation may be countenanced in the initial deposit. Conversely, high fugitive material removal temperatures can be used, so long as the initial oxidation is low or the material has inherent characteristics so that it does not obtain excessive oxidation. The data in FIG. 1 show that it is difficult to obtain the desired result using the high temperature polyester resin which is referred to in the above mentioned patent to Longo et al, although such practice can be used if desired.

We obtain a more desirable seal structure when we use a meltable polymer, of which polymethylmethacrylate is the preferred choice. In contrast, the polyester resin we refer to above does not appear to melt during spraying and gives a less open structure, as disclosed in the related application. Another measure of the advantage of the use of the meltable polymer is that the oxidation behavior of the porous seal material is superior, compared to a virtually identical abradable seal material made with the non-melting polyester material. For instance, in 100 hr exposure to a temperature of 540° C., the polyester-made −325 nichrome seal material will have an oxide content of about 40+% whereas the polymethylmethacrylate-made material will have an oxide content of about 30+%. We do not exactly understand what phenomena underlies this, but we believe it is related to the internal structure of the abradable material. As the photographs show in our related application, the polymethamethylacrylate material will assume a spherical shape during spraying whereas the non-melting polyester material has an irregular shaped surface. Since the frozen metal droplets presumably conform to the shape of the plastic with which they are in contact, the surface area of the abradable material made with the meltable polymer may be lower. Thus, our preferred seals have an internal pore shape which has spherical surface shapes. Since we desire to minimize oxide content, it follows that our preferred seals are made by a thermal spray method which provides them with internal pores having spherical surface sections. Using a meltable polymer provides this result and makes easier the other parts of the manufacturing process.

Typically, the abradable material is sprayed onto a metal alloy substrate having a curved shape, such as IN 718 nickel alloy or AISI 410 iron base alloy. The procedures followed to cause the abradable material to adhere to the substrate are those which are conventionally employed in plasma arc spraying, and special substrate treatments may be applied to achieve other objects than those to which the present invention is directed. While we have focused on the performance of seals for the compressor section of a gas turbine engine, where the temperatures of use are 650° C. or less, the principles of our invention will be useful in other parts of such machines, and in other machines.

Although this invention has been shown and described with respect to a preferred embodiment, it will be understood by those skilled in the art that various changes in form and detail thereof may be made without departing from the spirit and scope of the claimed invention.

We claim:

1. An abradable metallic seal material comprised of porous nickel alloy metal having an apparent density of 27–38 percent and an oxide content of no more than 1–30 weight percent.

2. The material of claim 1 having a density of 28–32 percent.

3. The material of claim 2 having a density of 30–32 percent.

4. The invention of claim 1 characterized by the material shaped as a curved seal and characterized in that glazing does not occur when titanium alloy blade tips rotating with a 290 m/s tip speed engage the seal at a penetration rate of about 0.05 mm/s.

5. The material of claim 4 characterized in that the volume wear of a set of six engaging titanium alloy blade tips is less than 1/250 of the volume wear of the curved seal material when the blades have penetrated about 1 mm into the material.

6. The invention of claim 1 characterized by the nickel alloy metal being a nichrome alloy.

7. The invention of claim 6 characterized by the nickel alloy metal consisting essentially by weight percent of 80Ni and 20Cr.

8. The invention of claim 1 characterized by the nickel alloy metal being a nichrome alloy having a density and oxide content falling within region A of FIG. 1.

9. The invention of claim 1 characterized by the pores of the nickel alloy metal having spherical shapes.

10. The invention of claim 1 characterized by an oxide content of 1–15 percent.

11. The material of claim 1 produced by plasma arc spraying the nickel metal alloy.

12. The material of claim 11 produced by spraying the nickel metal alloy onto a superalloy substrate so it adheres thereto.

13. A metallic material useful as an abradable seal comprised of a porous metal alloy having an oxide content of no more than 1–30 weight percent and a Rockwell$_{10}$Z superficial hardness number of 45–85.

14. The material of claim 13 having a hardness number of 50–75.

15. The invention of claim 13 characterized by the material shaped as a curved seal and characterized in that glazing does not occur when titanium alloy blade tips rotating with a 290 m/s tip speed engage the seal at a penetration rate of about 0.05 mm/s.

16. The material of claim 15 characterized in that the volume wear of a set of six engaging titanium alloy blade tips is less than 1/250 of the volume wear of the curved seal material when the blades have penetrated about 1 mm into the material.

17. The invention of claim 13 characterized by the metal alloy being a nichrome alloy.

18. The invention of claim 17 characterized by the metal alloy consisting essentially by weight percent of 80Ni and 20Cr.

19. The invention to claim 13 characterized by the metal alloy being a nichrome alloy having a density and oxide content falling within region A of FIG. 1.

20. The invention of claim 13 characterized by the pores of the metal alloy having spherical shapes.

21. The invention of claim 13 characterized by an oxide content of 1–15 percent.

22. The method of obtaining a desired combination of erosion resistance and abradability in a metal abradable seal which comprises controlling both the relative density of the seal in the range 27–38 percent and the oxide content in the range of 1–30 percent.

23. The method of obtaining a desired combination of erosion resistance and abradability in a metal abradable seal which comprises controlling both the relative Rockwell$_{10}$Z superficial hardness of the seal in the range 27–38 percent and the oxide content in the range of 1–30 percent.

* * * * *